US010449888B2

(12) United States Patent
Goedken et al.

(10) Patent No.: US 10,449,888 B2
(45) Date of Patent: Oct. 22, 2019

(54) TRAILER FOR TRANSPORT OF FRACKING SAND

(71) Applicant: Kann Manufacturing Corporation, Guttenberg, IA (US)

(72) Inventors: Kenneth D. Goedken, Dubuque, IA (US); Jared L. Rowland, Dyersville, IA (US); Marlin L. Johnson, Guttenberg, IA (US); Roger Taake, Elkader, IA (US)

(73) Assignee: Kann Manufacturing Corporation, Guttenberg, IA (US)

( * ) Notice: Subject to any disclaimer, the term of this patent is extended or adjusted under 35 U.S.C. 154(b) by 0 days.

(21) Appl. No.: 16/045,324

(22) Filed: Jul. 25, 2018

(65) Prior Publication Data

US 2018/0326888 A1    Nov. 15, 2018

Related U.S. Application Data

(62) Division of application No. 14/524,296, filed on Oct. 27, 2014, now Pat. No. 10,059,245.

(60) Provisional application No. 61/895,847, filed on Oct. 25, 2013.

(51) Int. Cl.
*B60P 1/56*    (2006.01)
(52) U.S. Cl.
CPC ...................... *B60P 1/56* (2013.01)
(58) Field of Classification Search
CPC ........................................................ B60P 1/56

USPC .......... 298/27; 102/247, 248, 249, 250, 251, 102/252, 253
See application file for complete search history.

(56) References Cited

U.S. PATENT DOCUMENTS

| | | | |
|---|---|---|---|
| 2,598,254 A | 5/1952 | Grueneberg | |
| 2,795,080 A | 6/1957 | Williams | |
| 3,415,204 A | 12/1968 | Pase | |
| 3,581,945 A | 6/1971 | Savage | |
| 3,596,565 A | 8/1971 | Atkinson | |
| 4,009,906 A | 3/1977 | Sweet et al. | |
| 4,359,176 A | 11/1982 | Johnson | |
| 5,046,432 A | 9/1991 | Bowler | |
| 5,272,987 A | 12/1993 | Lucas | |
| 6,024,023 A | 2/2000 | Magolske | |
| 6,932,433 B2 | 8/2005 | Heider et al. | |
| 8,371,657 B2 | 2/2013 | Bielfelt | |
| 8,850,991 B2 | 10/2014 | Early et al. | |
| 10,059,245 B2 * | 8/2018 | Goedken | B60P 1/56 |
| 2001/0002766 A1 | 6/2001 | Friesen | |
| 2004/0178233 A1 | 9/2004 | Medemblik | |
| 2005/0168047 A1 | 8/2005 | Grier | |
| 2007/0188010 A1 | 8/2007 | Miller et al. | |
| 2010/0270848 A1 | 10/2010 | Heider et al. | |

* cited by examiner

*Primary Examiner* — Hilary L Gutman
(74) *Attorney, Agent, or Firm* — Shuttleworth & Ingersoll, PLC; Brett Papendick

(57) ABSTRACT

An assembly for a fracking sand trailer wherein a door can be positioned to allow a measured flow of sand to exit the assembly. The assembly can be attached to a hopper of a trailer and can stand the weight of heavy loads associated with sand. A trailer with the assembly is also described and utilizes specific construction techniques to lighten the weight of the trailer.

10 Claims, 9 Drawing Sheets

TRAILER FOR TRANSPORT OF FRACKING SAND

CROSS-REFERENCE TO RELATED APPLICATIONS

The present application is a divisional of U.S. patent application Ser. No. 14/524,296 filed Oct. 27, 2014, which application claims priority to provisional patent application 61/895,847 which was filed on Oct. 25, 2013, both applications are hereby expressly incorporated by reference in their entirety.

BACKGROUND

Due to recent advancements in drilling technology that employ hydraulic fracturing or "fracking", it is now possible to extract natural gas and oil deposits from shale rock layers deep within the earth that were once unreachable with conventional technologies. Fracking is the process that injects a highly pressurized fracking fluid, a major component being fracking sand, into the shale area to create new channels within the rock for natural gas or oil to be extracted at higher than traditional rates. With the advent of fracking and the increase in demand for fracking sand, new methods of transporting this very specialized sand is required.

Conventionally, raw sand is transported over the road by steel dump trucks and end dump or belly dump style semi-trailers. These conventional sand transport methods load and dump sand in bulk and do not allow for any type of metering capabilities, especially during the unloading process. Fracking sand is a very specialized type of sand, wherein raw sand is processed and dried to meet specific characteristics and properties needed in the hydraulic fracturing process. Once processed, the sand must normally be transported to a railroad or truck terminal for further transport to the often remote drilling fields. Since one common and efficient method of transferring sand from a truck or trailer to a train car is by means of a conveyor system, metering the unloading of fracking sand is required so that the conveyor system is not overwhelmed by a sudden influx of sand being dumped upon it.

In the attempt to be able to meter fracking sand, companies have tried to use dual hopper grain trailers which contain two hoppers and small bottom gates that are no more than two feet by two feet in area, but due to the abrasive and corrosive properties of the fracking sand, these trailers quickly deteriorate and have extreme maintenance costs. Though a dual hopper grain trailer has a hopper door opening that works well for low moisture content grain, it is undersized for unloading raw wet sand, so it cannot be used as a dual purpose trailer for both wet raw sand and dry fracking sand.

It is an object of the invention to provide a sand trailer with an oversized hopper door opening to allow raw sand, particularly raw wet sand, to be quickly and easily unloaded.

It is a further object of the invention to provide a sand trailer with the ability to control the flow rate of the fracking sand exiting the sand trailer.

DETAILED DESCRIPTION

The present invention provides a solution to unload wet raw sand and control the flow of dry fracking sand during unloading of the trailer. Existing trailer can be retrofitted with the door assembly and new trailers can be constructed with the door assembly.

Figure 1:
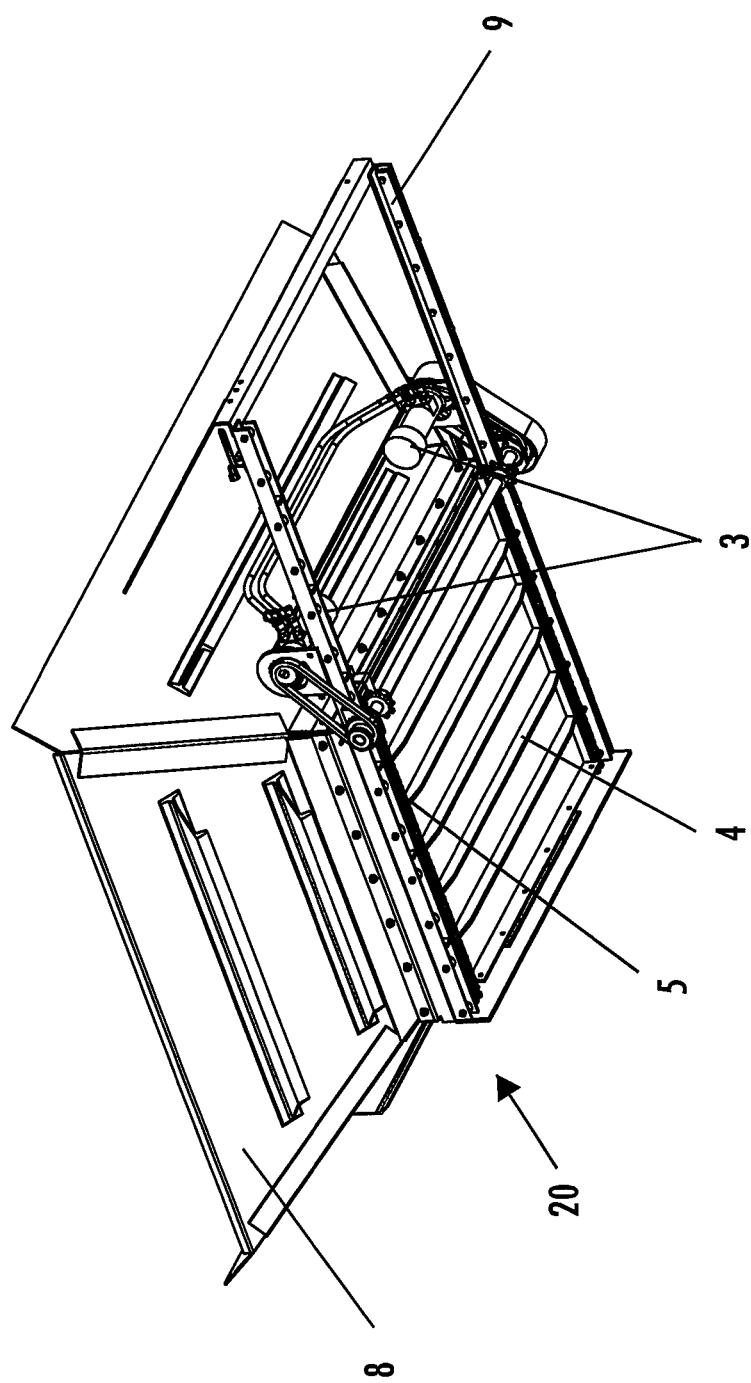
FIG. 1 is a bottom perspective view of the door assembly on a hopper.
Figure 2:
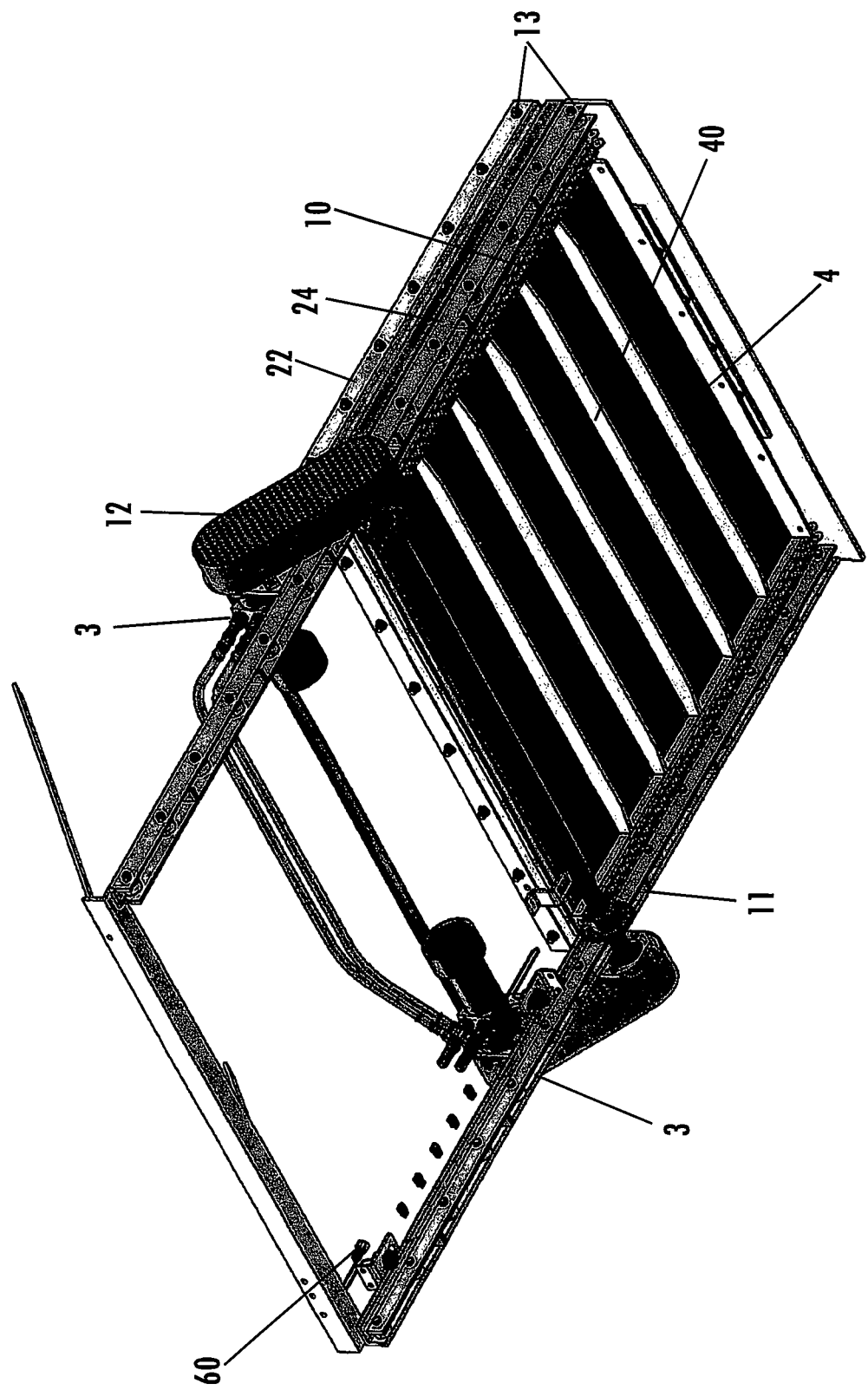
FIG. 2 is a bottom perspective view of the door assembly.
Figure 3:
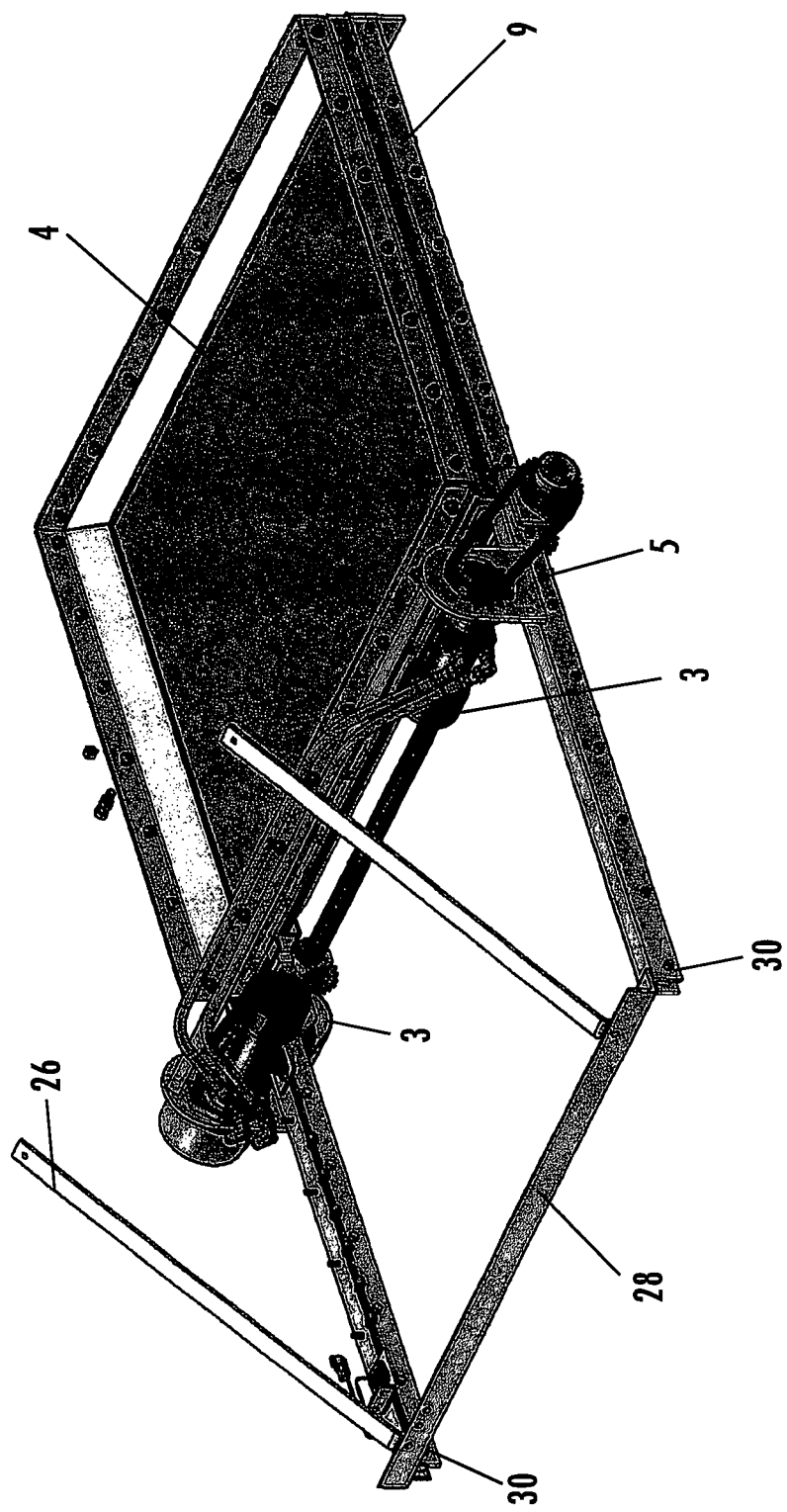
FIG. 3 is a top perspective view of the door assembly.
Figure 4:
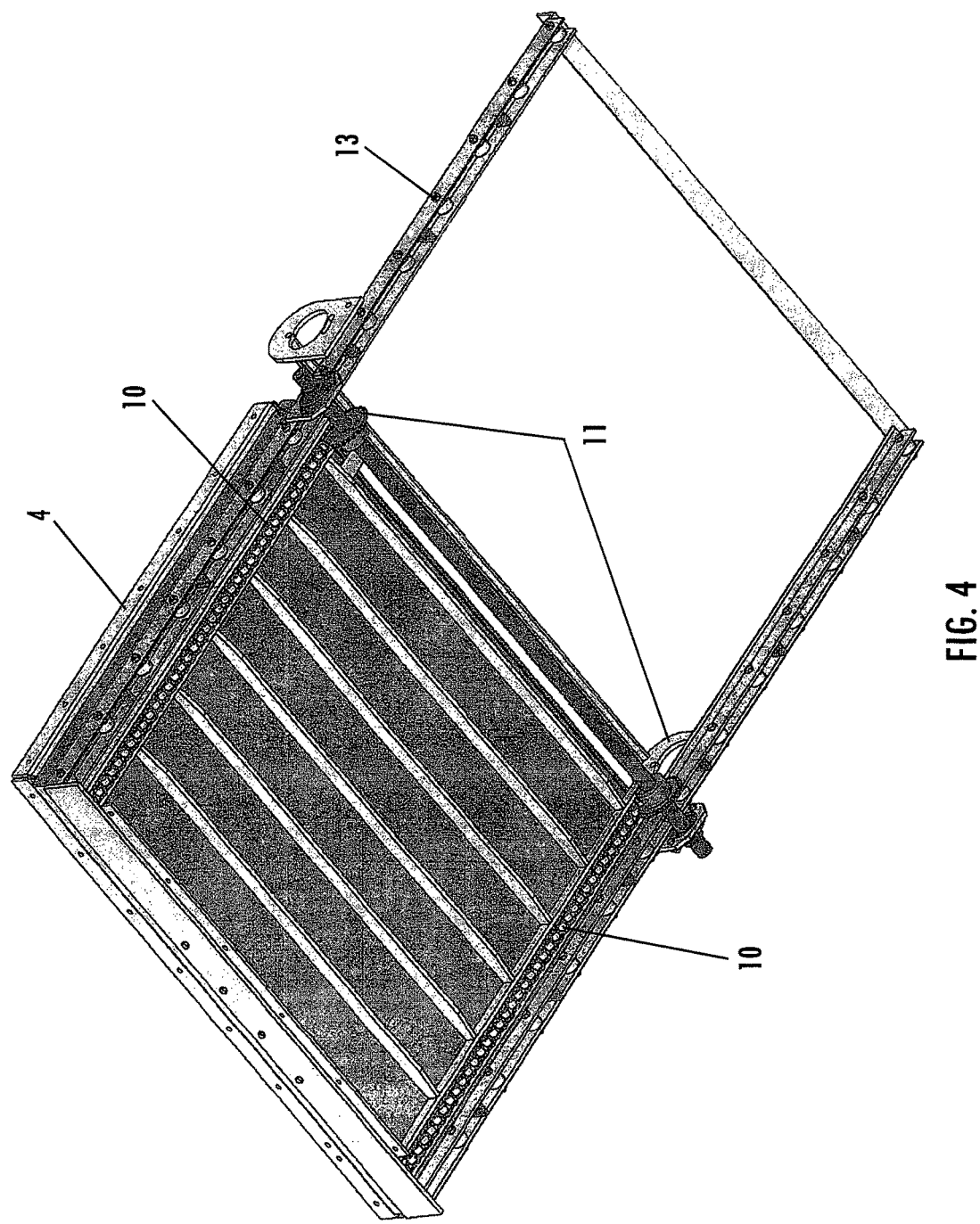
FIG. 4 is a bottom perspective view of the door assembly.
Figure 5:
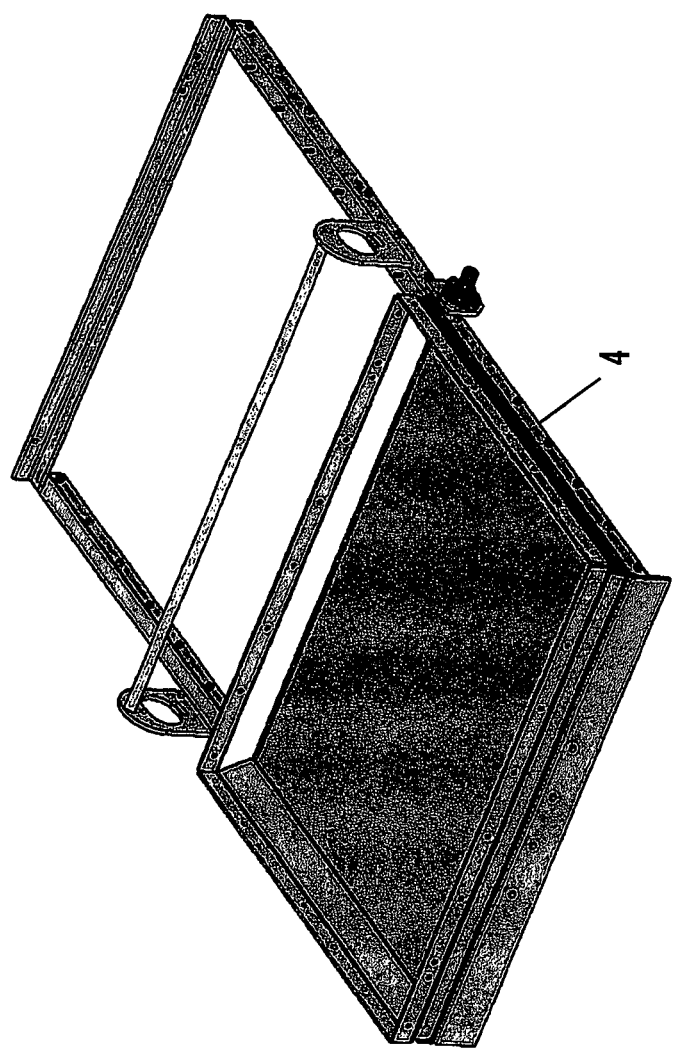
FIG. 5 is a top perspective view of the door assembly without the motor and gears.
Figure 6:
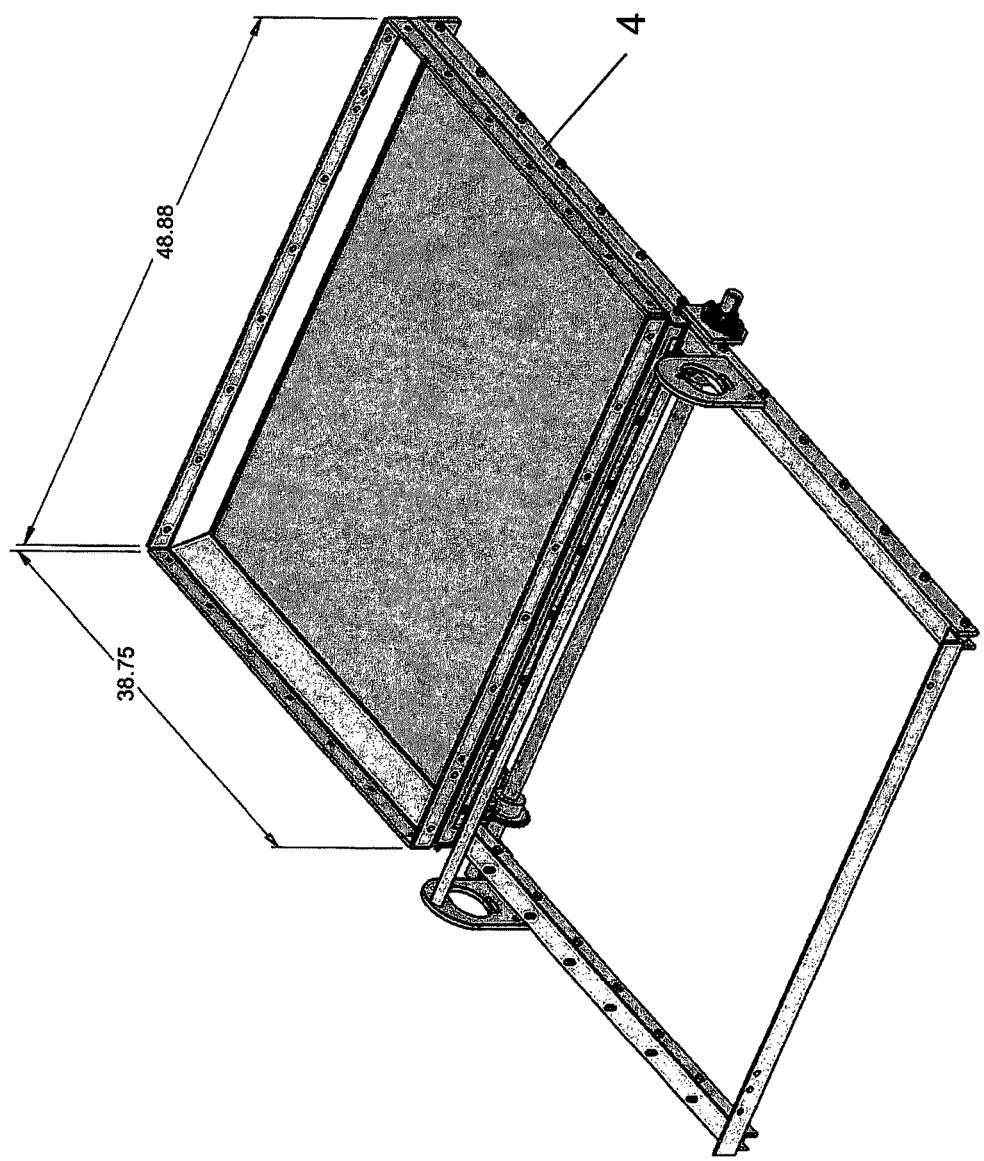
FIG. 6 is a top perspective view of the door assembly without the motor and gears.
Figure 7:
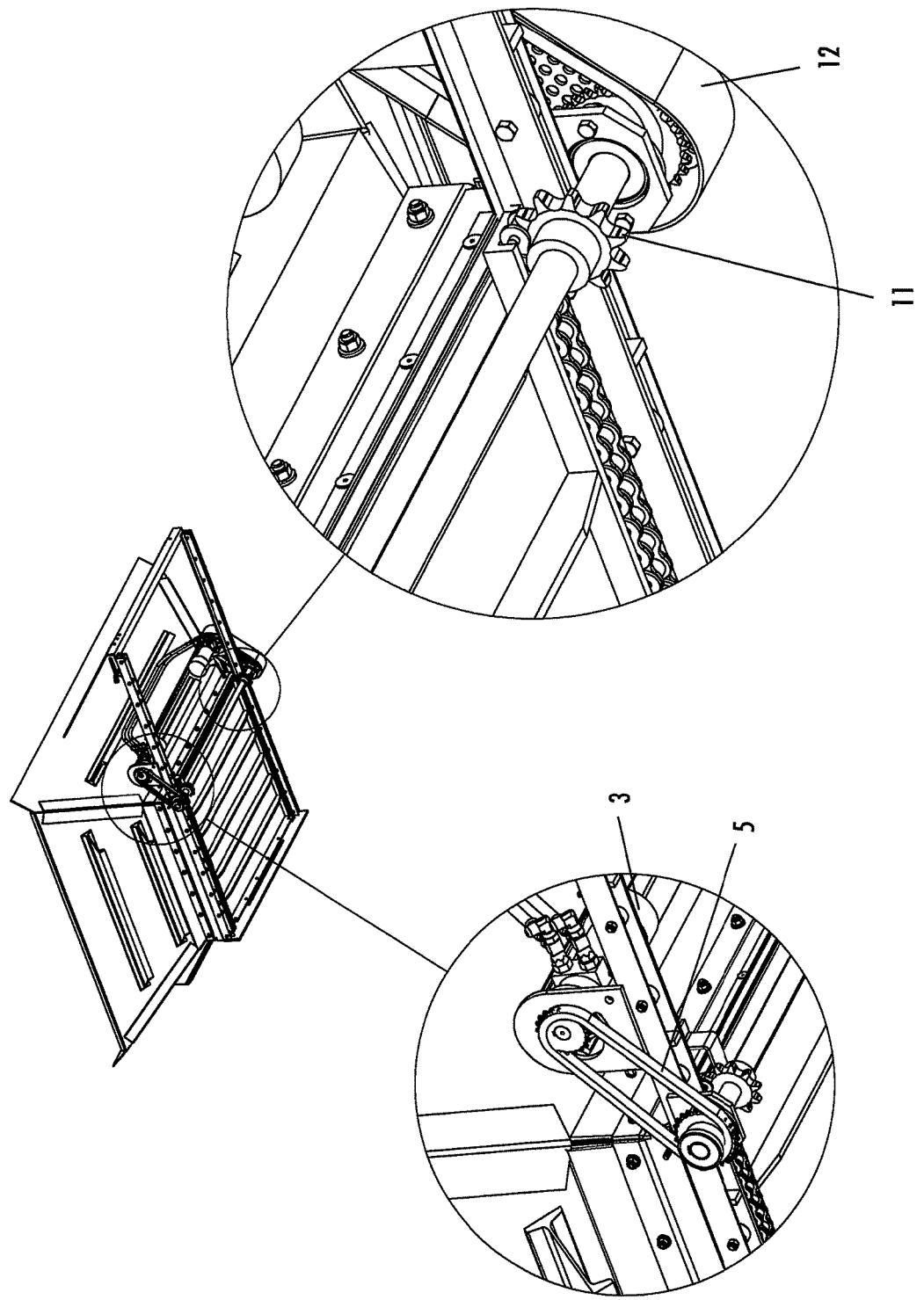
FIG. 7 is a series of figures detailing the motor and gears of the door assembly.
Figure 8:
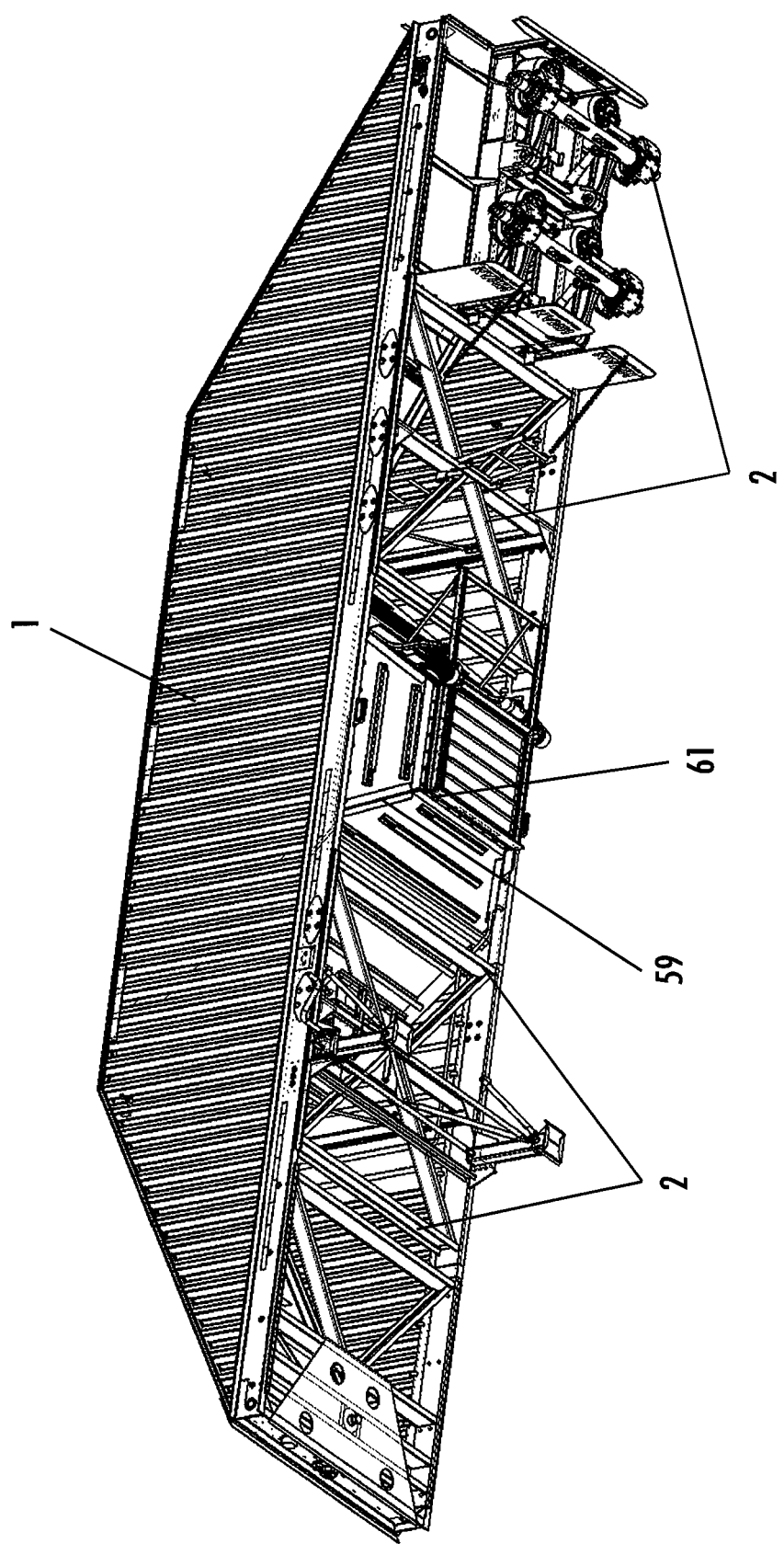
FIG. 8 is a bottom perspective view of the door assembly on a trailer.

FIGS. 1 through 7 illustrate an assembly 20 mounted to a hopper 8 of a fracking sand trailer 1 (see FIG. 8). The assembly 20 comprises a door frame 9 with an upper subframe 22 and a lower subframe 24, all preferably made of steel. A slidable door 4 is housed between the upper subframe 22 and lower subframe 24. The lower subframe 24 is preferably sized such that it is twice the length of the door 4 and the upper subframe 22. Ends 30 of the lower subframe 24 may be linked by a cross member 28. The cross member 28 is then connected to the trailer 1 via a pair of elongated arms 26 so that the ends 30 of the lower subframe 24 are supported by the trailer 1. The upper subframe 22 is connected to the hopper 8 of the trailer 1. The door 4 is preferably made of steel and is reinforced with a plurality of reinforcement members 40 which span from one side of the door frame 9 to a second side of the door frame 9. The reinforcement members 40 strengthen the door 4.

The door 4 is slidable between the upper subframe 22 and lower subframe 24 supported on rollers 13 mounted to the lower subframe 24. The rollers 13 are preferably made of steel and bolted into place to withstand the conditions of unloading the trailer 1. The door 4 is provided with segments of roller chain 10 which are fixed to each opposing side of the door 4 and allow the door 4 to be driven through motors 3. Each motor 3 selectively drives a gear reducer 5 which rotates a sprocket 11 which engages the roller chain elements of the respective segments of roller chain 10. By use of hydraulic powered motors, sufficient driving force, which may be multiplied through a gear reducer 5 applies sufficient power to overcome the friction of a hopper full of sand weighing upon the door 4.

A shield or cover 12 covers the drive shaft of each motor 3 along with an endless drive chain or belt which couples the drive shaft of each motor to drive sprockets 11, and a chain drive gear reduction 5. Due to the sheer weight of the sand in the trailer 1 and the conditions during unloading, the motor 3 is preferably hydraulically powered. The chain track 10, which is also preferably steel, interacts with the drive sprockets 11 such that when the motor 3 is activated, the door 4 can be moved from a first position which is a fully closed position to a second position which is at least partially opened. Preferably the door 4 can be opened incrementally between any position between the first position and second position, that is, from an entirely closed position to a partially closed position to a completely open position. The spacing of the roller chain elements of each chain track 10 and the gears on the drive sprockets 11 will dictate the incremental positions of the door 4 relative to the opening of the hopper 8.

The assembly 20 is mounted to the hopper 8 of the trailer 1 by attaching door frame 9 to trailer frame 2 through use of lateral bolts (See FIG. 3) or the assembly can be welded to the trailer 1. The majority of the trailer 1 has portions made of a light weight material, preferably aluminum and preferably corrugated aluminum, while certain portions are made of a stronger material such as steel to reinforce the aluminum. The combination of the lightweight aluminum trailer body with a steel reinforced trailer frame allows the fracking sand trailer to be light but durable. The light weight relative to dump trucks and belly dump trailers provides some of the highest sand payloads while not exceeding highway weight limitations. The durability still allows the sand trailer to operate over the toughest road conditions. Preferably many aluminum components of the hopper and sidewalls of the trailer are welded together though rivet construction methods may be used to assemble the trailer body.

Figure 9:
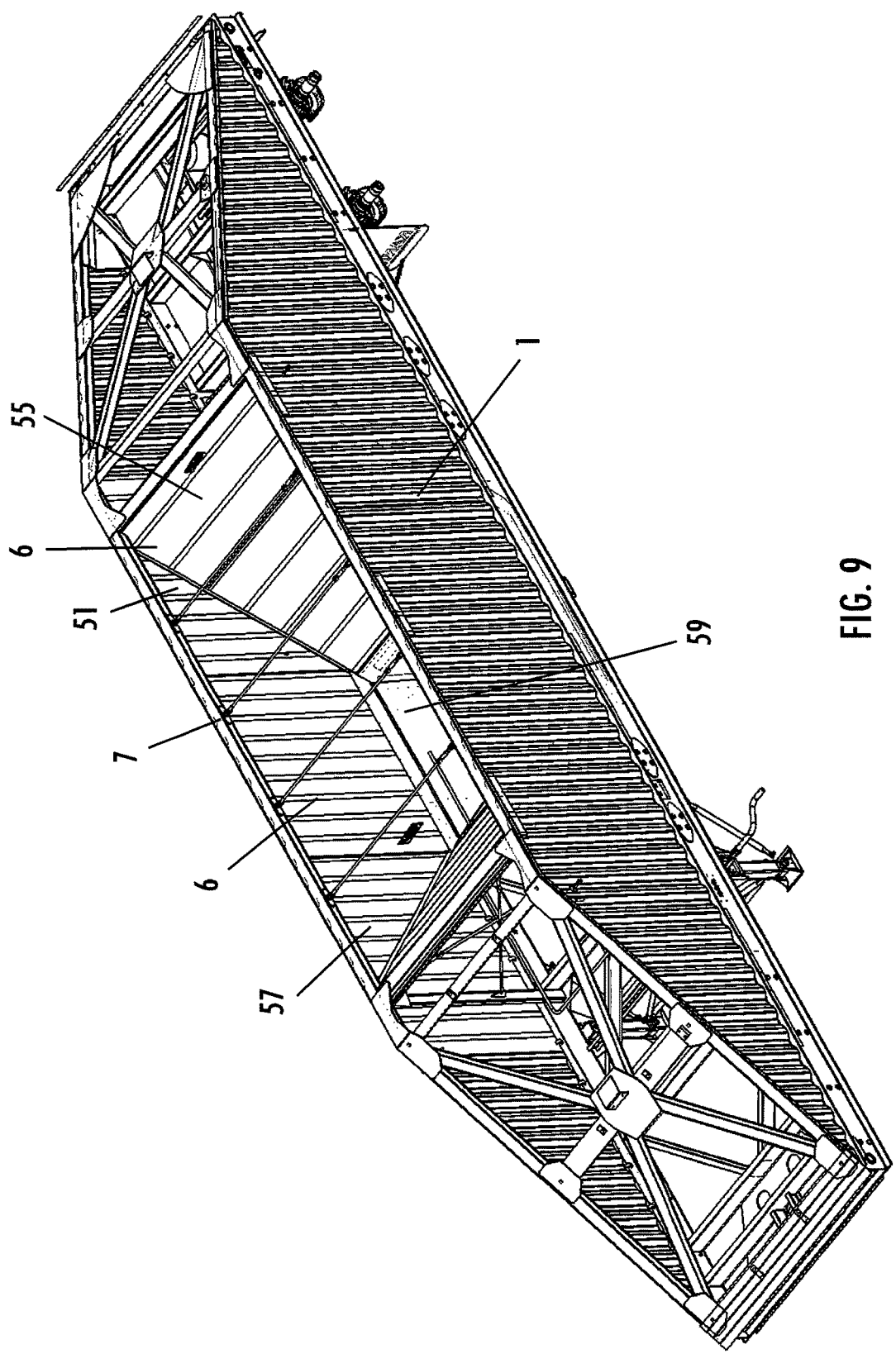
FIG. 9 is a top perspective view of the trailer.

The trailer 1 can be seen in detail in FIGS. 8-9. The trailer 1 has a top opening 51 which allows sand to be loaded into the trailer 1. A plurality of diffusers 7 is placed at the top of the trailer 1 which traverse the trailer 1 from side wall to side wall. The diffusers 7 serve to deflect incoming sand and to decelerate it so as to protect the door 4 from incurring excess direct impact during of the loading of the trailer 1. The diffusers 7 are preferably made of steel and provide reinforcement to the aluminum body. The trailer 1 is designed with steep angled interior walls 55 having a polymeric liner 6 that covers the hopper completely. The sidewalls 57 of the hopper 8 may be substantially perpendicular relative to the bottom of the trailer while the chute 59 includes sidewalls and end walls which converge as they approach the door 4, though the angle of the sidewalls and end walls of the chute 59 are steep and diverge from vertical by only a small angle. The use of vertical and almost vertical sidewalls of the hopper and chute facilitate the unloading of either fracking sand or raw sand, but the large door opening of approximately four feet by four feet prevents bridging of moist sand over the opening, which is the shortfall of the use of a standard bottom dump grain trailer. The liner is preferably ⅜ of an inch in thickness and made of plastic. The hopper 8 is preferably in the middle of the trailer 1, as shown in the figures, and extends for a distance past the bottom wall of the trailer 1.

In operation, the trailer 1 is loaded with sand from the top of the trailer 1. If the trailer is loaded with unprocessed, wet sand, then the trailer 1 is typically transported to a site for processing. As wet sand can become stuck in existing trailers during unloading, several of the features of the present invention aid in unloading the trailer 1 when loaded with wet sand. The steep walls 55 and liner 6 assist in dropping the sand out of the hopper 8. Additionally, the oversized bottom opening (approximately four feet by four feet) of the hopper assists in preventing wet sand from blocking the flow out of the hopper 8. Additionally, the use of hydraulic motors 3 allow the door 4 to be opened quickly, thus allowing the wet sand to immediately exit through the oversized opening.

If the trailer is loaded with processed, dry fracking sand, then the trailer 1 is typically transported to an intermodal site where rail cars are loaded with the fracking sand for transport to distant oil drilling fields. Because the rail cars are usually loaded by use of a conveyor with a below grade intake area, the trailer 1 may be moved such that door opening 61 is located over the intake area and the door 4 can be opened to the proper extent to meter output of sand from the trailer 1 such that the conveyor used to load the rail care is not overloaded and remains operating efficiently.

The lightweight aluminum composition of the trailer 1 allows more sand to be loaded compared to the current state of the art trailer. A sensor 60 is provided to detect when the door is in its fully opened position and optionally a detector could be employed to determine the amount that the door 4 has been moved, such as counting the revolutions of each motor 3 from which can be derived the lateral movement of the door 1.

Because the door 4 covers an opening of approximately four feet by four feet (however a door can be constructed for a variety of sizes), raw sand will drop through the door opening quickly and efficiently without bridging the opening, while dry fracking sand can likewise be transported and emptied in a controlled operation over a loading conveyor for a rail car.

What is claimed is:

1. A sand trailer, comprising:
a body;
a hopper;
a reinforced frame;
a diffuser placed across an opening of the trailer;
wherein the diffuser deflects materials loaded into the trailer thereby protecting the hopper and a hopper door;
the diffuser having a diffuser frame;
the diffuser frame having a first side;
the diffuser frame having a second side;
the first side at a first edge of the diffuser frame;
the second side at a second edge of the diffuser frame;
the first edge opposite of the second edge;
a plurality of reinforcement members spans from the first side of the diffuser frame to the second side of the diffuser frame;
the plurality of reinforcement members span from the first edge to the second edge;
a pair of spaced apart axle receivers extending above a skid plate;
a door;
the plurality of reinforcement members span the entire length of the door;
at least one of the plurality of reinforcement members is located on a non-periphery of the door;
the door movable from a first position to a second position;
the first position is a closed position;
the second position is at least a partially open position;
a motor capable of moving the door from the first position to the second position;
a track wherein the door moves along the track.

2. The sand trailer of claim 1, wherein:
the first position is fully closed;
the second position is fully open;
the door movable from the fully closed position to the fully open position;
the door movable to a plurality of positions between the first position and the second position for commodity metering capabilities.

3. The sand trailer of claim 2, wherein:
the motor is connected to a gear reduction system;
a sprocket engages the track.

4. A fracking sand trailer assembly, comprising:
a body;
a frame;
a door;
the door movable from a first position to a second position;
the first position is a closed position;
the second position is at least a partially open position;

the frame having a first side;
the frame having a second side;
the first side at a first edge of the frame;
the second side at a second edge of the frame;
the first edge opposite of the second edge;
a plurality of reinforcement members span the entire length of the door;
the plurality of reinforcement members spans from the first side of the frame to the second side of the frame;
the plurality of reinforcement members span from the first edge to the second edge;
at least one of the plurality of reinforcement members is located on a non-periphery of the door;
a motor capable of moving the door from the first position to the second position;
the motor is a hydraulic motor;
a track wherein the door moves along the track;
a sensor capable of determining the location of the door relative to a portion of the assembly.

5. The assembly of claim 4, further comprising:
roller chain elements.

6. The assembly of claim 5, wherein:
a gear reducer that rotates a sprocket to engage the roller chain elements.

7. The assembly of claim 6, wherein:
a shield covers a drive shaft of the motor.

8. The assembly of claim 7, wherein:
the door can be incrementally opened between the first and second position.

9. The assembly of claim 8, wherein:
the frame is connected to a hopper.

10. The assembly of claim 1, wherein:
the door is made of steel.

* * * * *